United States Patent [19]

Meyers

[11] Patent Number: 5,131,603
[45] Date of Patent: Jul. 21, 1992

[54] ROTARY WING AIRCRAFT SPLIT SEGMENTED DUCT SHROUDED PROPELLER TAIL ASSEMBLY

[75] Inventor: Donald N. Meyers, Wyncote, Pa.

[73] Assignee: Piasecki Aircraft Corporation, Essington, Pa.

[21] Appl. No.: 694,651

[22] Filed: May 2, 1991

[51] Int. Cl.⁵ .............................................. B64C 27/82
[52] U.S. Cl. ................................. 244/17.19; 244/51; 244/110 B; 239/265.19; 239/265.31
[58] Field of Search ..................... 244/17.19, 17.21, 51, 244/52, 110 B, 12.5, 23 D; 239/265.19, 265.29, 265.31, 265.11

[56] References Cited

U.S. PATENT DOCUMENTS

| | | | |
|---|---|---|---|
| 2,735,264 | 2/1956 | Jewett | 244/110 B |
| 3,047,254 | 7/1962 | Spearman et al. | 244/52 |
| 3,260,482 | 7/1966 | Stroukoff | 244/51 |
| 3,957,226 | 5/1976 | Daggett, Jr. et al. | 244/52 |
| 4,099,671 | 7/1978 | Leibach | 239/265.29 |
| 4,905,932 | 3/1990 | Piasecki | 244/57 |
| 5,007,495 | 4/1991 | Yoshida et al. | 244/110 B |

Primary Examiner—Galen Barefoot
Attorney, Agent, or Firm—Willard M. Hanger

[57] ABSTRACT

An improved version of a vectored thrust ducted propeller tail assembly or "ring tail" for rotary wing aircraft in which a deflecting surface or surfaces is pivotally mounted behind the shrouded propeller in the tail duct for rotation transversely of the duct interior in deflecting the propeller slip stream transversely of the duct establishing a transversely directed thrust for providing rotor torque counteracting and aircraft yaw control. In the improved version the slip stream deflecting surfaces are pivotally supported to extend transversely across the duct rear exit in both directions as will deflect the propeller slip stream either out the left or the right sides or out both the left and right sides of the duct end. In this version the deflecting surfaces comprise a rudder surface pivotally mounted to swing between a neutral position coincident with the duct longitudinal axis and fully deflected positions extending transversely across the duct interior in either direction and a pair of arcuate duct end sectors each configured to partially circumferentially overlie an end portion of the respective opposite lateral sides of the duct. The sectors are pivotally supported for rotation between a stowed position in which each sector of the pair spans a duct end portion of respective opposite lateral sides of the duct and alternate extended positions in which both sectors are arranged in a juxtaposed array with adjacent side edges abutting.

15 Claims, 3 Drawing Sheets

ROTARY WING AIRCRAFT SPLIT SEGMENTED DUCT SHROUDED PROPELLER TAIL ASSEMBLY

BACKGROUND OF THE INVENTION

This invention relates to an improved version of a vectored thrust ducted propeller tail assembly, sometimes referred to as a ring tail, for rotary wing aircraft in which a shrouded propeller contained within the tail duct incorporates provisions for deflecting the propeller slip stream emerging from the tail duct transversely of the aircraft for developing the lateral thrust forces necessary to counteract rotor torque and establish directional yaw control of the aircraft. Although highly effective for conventional helicopter types, a vectored thrust ducted propeller tail assembly configuration is particularly effective for use in compound helicopters in which the rotor is unloaded in the high forward speed range with lift being provided by the fixed wing and forward propulsion being provided by the thrust of the shrouded propeller.

The invention of this application is directed to improving the maneuvering agility of ring tail rotary wing aircraft, particularly yaw agility, which is of great importance in military rotary wing aircraft in which the aircraft must be turned to the proper heading in aiming its armament. Under combat conditions the ability to quickly change heading to the direction in which the armament must be aimed is often critical, hence military requirements necessitate military aircraft being able to establish an angular turning acceleration that will turn the aircraft 180 degrees in either direction within a few seconds under all flight conditions including those involving low rotor shaft torque and a power off mode of autorotation. Also, combat maneuvering agility is greatly improved by an ability to establish a high rate of acceleration or deceleration of aircraft speed along the line of flight.

Known shrouded propeller aircraft configurations, such as those disclosed in U.S. Pat. Nos. 3,222,012 and 3,260,482 and the latest configuration of U.S. Pat. No. 4,905,932, incorporate a combination of propeller slip stream deflecting surfaces at the rear of the tail duct as will deflect the emerging propeller slip stream of a required intensity in a direction that the resulting thrust establishes a rotor torque counterbalancing couple of the necessary magnitude to maintain the desired aircraft heading. The torque applied to an aircraft by the rotor being opposite the direction of rotor rotation, in a rotary wing aircraft having a counterclockwise rotating rotor of the nature disclosed in U.S. Pat. No. 4,905,932, the propeller slip stream is deflected to the left as it emerges from the exit side of the tail duct establishing a starboard thrust creating a rotor torque counterbalancing moment. The magnitude of the transversely directed thrust is established by the propeller pitch, this thrust provides yaw control as the thrust becomes equal to, greater than, or less than that required to counterbalance rotor torque. Initiating a counterclockwise or left turn for the counterclockwise rotating rotor aircraft of the type disclosed in U.S. Pat. No. 4,905,932 requires the propeller pitch be increased an amount as creates a starboard thrust greater than that required to counterbalance rotor torque. Similarly, a clockwise or right turn requires the propeller pitch be decreased to the degree that the generated starboard thrust is less than that required to counterbalance rotor torque. Therefore, the maximum rate of rotation that can be generated for a clockwise turn to the right is dependent upon the amount of rotor shaft torque that is being created to sustain the aircraft in flight under existing flight conditions. For certain flight conditions the amount of rotor shaft torque might not be sufficiently great to establish the required angular turning acceleration that would be required for combat maneuverability. Obviously, the counterclockwise or left turning maneuverability of a clockwise rotating rotor ring tail aircraft encounters the same limitations. Therefore, to develop angular turning accelerations needed for certain combat situations while the aircraft is in a hover mode under certain flight conditions, turning torque additional to the torque being developed by the rotor shaft can be required.

Combat maneuverability for military rotary wing aircraft also involves an ability to rapidly accelerate or decelerate the forward motion of the aircraft. The ring tail configuration of shrouded propeller ring tail aircraft of the nature of those disclosed in the previously mentioned patents have the capability of rapid acceleration while in the forward high speed mode through rapidly increasing propeller pitch but forward speed deceleration is dependent upon aircraft drag which is a fixed amount and must be supplemented if a retardation rate of speed greater than that provided by the aircraft drag is required for combat maneuvering.

SUMMARY OF THE INVENTION

This invention is a variation of prior known vectored thrust ducted propeller tail assemblies which greatly improves the maneuvering agility of rotary wing aircraft with respect to both turning rates in the direction of rotor torque when in the hovering flight mode and speed retardation rate when in the forward high speed flight mode. In lieu of the tail assembly disclosed in U.S. Pat. No. 4,905,932 having a plurality of pivotally supported arcuate duct extension sectors stowable in a retracted position overlying one lateral sidewall of the duct and rotatable to an extended position forming an array lying rearwardly and obliquely of the duct for deflecting the emerging propeller slip stream to the left, the tail assembly of this invention has a pair of separately rotatable arcuate duct end sectors each stowable in a retracted position overlying a rear end portion of the lateral sidewall of opposite sides of the duct with the sectors being rotatable to alternative extended positions in which both arcuate sectors are positioned in an abutting, juxtaposed array that extends from the duct rear edge portions of either of the duct two opposite lateral sidewalls obliquely and transversely either to the right or the left across the rear of the duct so as to deflect the propeller slip stream either to the left or to the right as it emerges from the rear of the duct. A vertically extending rudder surface is supported from the duct for being swung to fully deflected positions transversely of the duct either to the right or to the left inside the internal diameters of the pair of duct extension sectors in their extended positions. The port thrust created by positioning the duct end sectors and rudder to their alternate positions as will deflect the propeller slip stream to the right supplements rotor torque and increases the rate at which an aircraft with a counterclockwise rotating rotor can turn to the right.

The pair of arcuate duct end sectors are also rotatable to a third extended position in which adjacent end portions of each of the pairs of sectors are in abutting adjacency behind the longitudinal centerline of the duct, thereby deflecting the propeller slip stream transversely of the duct in both directions as will diminish forward thrust and create high additional drag for rapid retardation of the aircraft in forward flight.

The primary object of this invention is to improve the maneuvering agility of shrouded propeller ring tail aircraft.

Another object of this invention is to provide turning torque in the direction of and additional to that of rotor torque of a rotary wing aircraft as will accelerate the turning rate of the aircraft in the direction of rotor torque.

Yet another object of this invention is to improve the rate at which the forward speed of a shrouded propeller ring tail aircraft can be retarded.

DETAILED DESCRIPTION OF THE INVENTION

Figure 1:
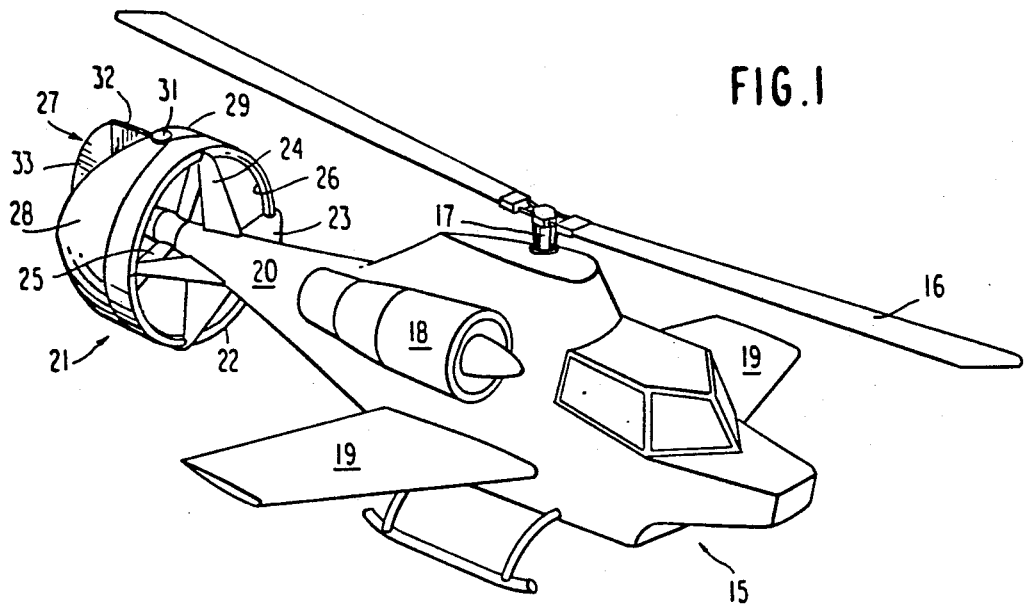
FIG. 1 is a perspective view of a counterclockwise rotor rotating rotary wing aircraft having the improved tail assembly contemplated by this invention.

FIG. 1 is an illustration of a compound rotary wing aircraft 15, generally similar to the shrouded propeller ring tail aircraft of the previously noted patents, in which a single rotor 16 is rotated counterclockwise by a rotor shaft 17 powered by an engine 18, fixed wings 19 extending outwardly from both sides of the fuselage 20 provide lift for forward flight under high speed cruising conditions with the rotor unloaded. The shrouded propeller or ring tail structure 21 comprises an annular duct 22 supported from the rear of the fuselage 20 by a horizontal stabilizer 23 and vertical stabilizer 24 with a controllable pitch propeller 25 powered by the engine 18 being mounted for rotation concentrically within the interior wall 26 of the annular duct 22. The yaw control components of the ring tail structure comprise a vertically extending rudder surface 27 pivotally supported from the duct for swinging motion to the left and right of the duct longitudinal axis rearwardly of the propeller and a pair of arcuate duct end sectors 28, 29 pivotally supported from the duct top and bottom centerlines for rotation about a vertical axis between the stowed position illustrated in FIG. 1 with each sector overlying a rear end portion of the lateral duct sidewall on each side of the duct and extended positions lying transversely and rearwardly of the duct interior as will subsequently be illustrated and described.

Figure 3:
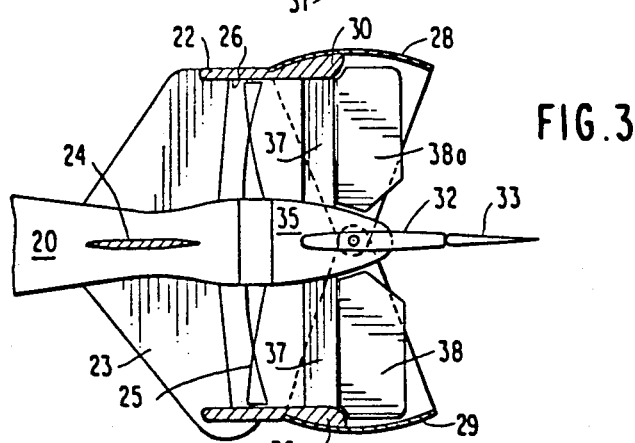
FIG. 3 is a horizontal cross-section along section lines 3—3 of FIG. 2.
Figure 4:
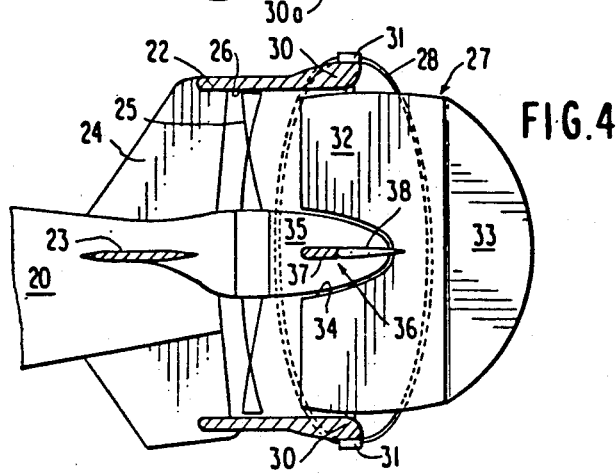
FIG. 4 is a vertical cross-section along section lines 4—4 of FIG. 2.
Figure 2:
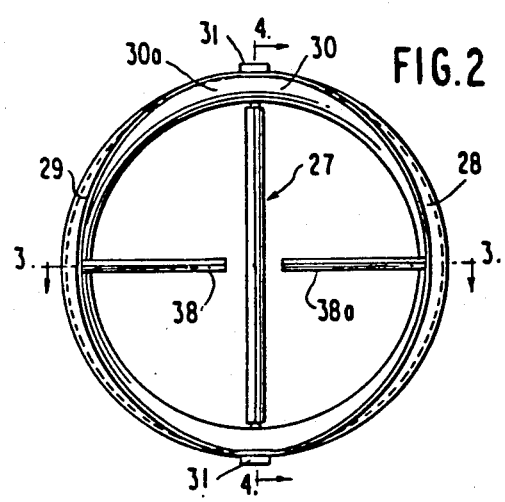
FIG. 2 is a rear elevation of the tail assembly of the aircraft of FIG. 1 with the tail assembly components positioned for a high cruising speed flight condition.

The ring tail structure and its slip stream deflecting components of this invention for establishing yaw control are best seen with reference to FIGS. 2-4 in which a pair of arcuate, semi-dome shaped, duct end sectors 28 and 29 each having a configuration and internal diameter as will conformingly overlie the duct rear wall portion 30 and 30a of each of the respective right and left lateral sidewalls of the duct. The duct end sectors are each pivotally connected at their top and bottom ends to the duct by pivotal connections 31 for rotation about a vertical axis between the retracted, stowed position of FIGS. 2-4 and extended positions lying rearwardly of the duct rear wall portion 30 and transversely of the duct interior in the manner illustrated in FIGS. 5-13 to be subsequently discussed. The slip stream deflecting rudder surface assembly 27, comprising a tandemly arranged pair of pivotally connected rudder panels 32, 33 is pivotally supported from the duct for rotation of the forward rudder panel 33 about a vertically extending axis. A middle portion of the forward rudder panel 32 is cut away along the line 34 to clear the propeller hub fairing 35. A linkage arrangement pivotally intercoupling the rudder panels 32, 33, of the nature disclosed in U.S. Pat. No. 3,260,432, establishes relative angular movement between the two pivotally intercoupled rudder panels when the forward panel 32 is rotated, whereby the camber of the rudder surface assembly 27 is changed when the forward rudder panel 32 is rotated in either direction each side of the rudder neutral position of FIG. 2 with the rudder panels in alignment with the duct longitudinal axis.

An aerodynamic control surface comprising one component of the ring tail structure, not evident in FIG. 1, is a horizontal elevator surface assembly 36 comprising a fixed horizontal stabilizing member 37 extending horizontally across the duct interior between the duct rear end portions 30, 30a of opposite lateral sidewalls of the duct. A pair of moveable elevator surfaces 38, 38a are pivotally supported from the rear of the fixed stabilizer member 37 on each side of the propeller hub fairing 35 for rotation upwardly and downwardly to positions establishing aircraft pitching trim moments.

As discussed in considerable detail in prior referenced shrouded propeller aircraft patents, the components of a shrouded propeller ring tail structure which control the aircraft in yaw are positioned and controlled to different degrees by pilot operated controls, dependent upon the particular flight condition in which the aircraft is being sustained in flight, i.e. hovering or high speed cruising flight. For hovering flight the propeller slip stream deflecting surfaces are positioned as will deflect the emerging propeller slip stream in a direction as will establish a transversely directed thrust of the magnitude necessary for yaw control of the aircraft, the magnitude of this thrust being a function of the pitch of the propeller which is conventionally controlled by the amount of deflection of the pilot operated rudder pedals which, in this mode, have no significant effect on the rotative position of the rudder surface. For cruising high speed flight with the rotor unloaded and aircraft lift being largely provided by the fixed wings, the ring tail components are positioned such that the direction at which the propeller slip stream emerges from the duct is largely unaffected, the rudder surface being neutrally centered along the duct longitudinal axis and deflection of the pilot operated rudder pedals moving the rudder sufficiently from the neutral position to establish necessary yaw control. In this cruising mode the propeller pitch control is set in the high pitch range in developing aircraft forward thrust to the point at which the propeller can absorb maximum engine power. The modification of conventional shrouded propeller ring tail structures involved in this invention provides augmented thrust in the direction of rotor torque when an accelerated turn in this direction is needed and also provides augmentation of forward speed retardation when the aircraft is operating in the cruising speed mode in a manner which will improve aircraft maneuvering agility when the modified ring tail structure of this invention is positioned and controlled as explained below by the control system schematically indicated in FIG. 14.

Figure 14:
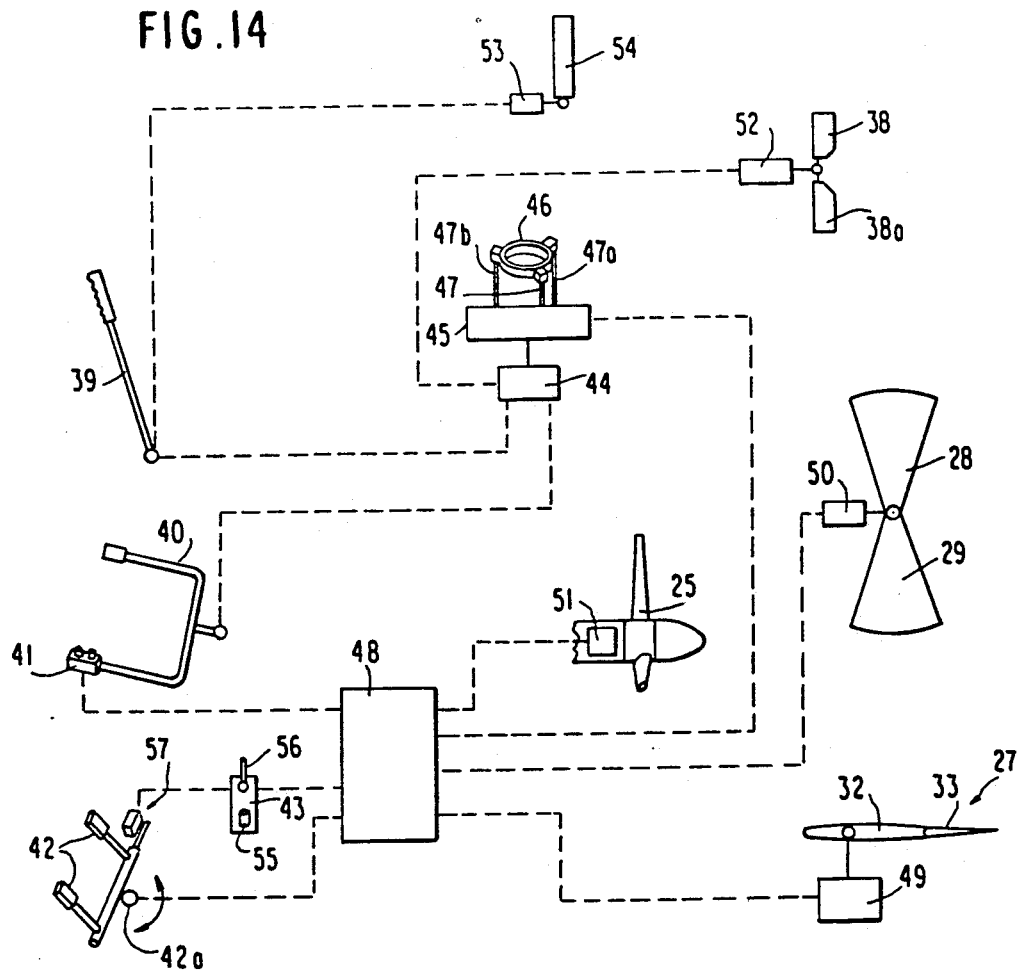
FIG. 14 is a schematic diagram of a control system for operating the tail assembly components of this invention.

The control system for the disclosed improved shrouded propeller ring tail structure of this invention establishes the positions and movements of the components of the improved ring tail structure relative to each other in coordination with the rotor swash plate pitch setting and positions of the aircraft aerodynamic control surfaces upon the pilot operating the cyclic and collective pitch controls and associated propeller pitch control switches during the full range of flight conditions as will provide a smooth and gradual transition between the hover and high speed cruising flight conditions of the aircraft. The components indicated schematically in FIG. 14 represent control system components equivalent to those described in U.S. Pat. No. 3,332,643 modified to incorporate provisions for coordinating movement of the duct end sectors 28, 29 and the rudder surface 27 along with propeller pitch settings as required to establish a high degree of agility and yaw control of the aircraft for all flight conditions from stationary hovering through high forward cruising speed and rapid speed retardation in the high cruising speed mode.

Referring to FIG. 14, with one exception, the pilot's controls are conventional in nature of the type disclosed in U.S. Pat. No. 3,332,643 comprising a cyclic control stick 39 for control of the aircraft attitude in pitch and roll, a collective pitch control lever 40 for control of the main rotor pitch collectively, a propeller pitch control beeper switch 41 for setting the propeller pitch in the high range required for high speed cruising or the low pitch range required for the hovering mode and normally mounted on the collective pitch control lever 40 and rudder pedals 42 for directional control of the aircraft in yaw. The additional pilot control is an agility maneuvering switch panel 43 for controlling the position of the duct end sectors 28, 29 as will improve maneuvering agility of the aircraft in the manner to be subsequently described. The control system components connected between the pilot's controls and the actuators for the main rotor swash plate, the propeller pitch control mechanism and the aircraft aerodynamic control services could be generally similar to those described in U.S. Pat. No. 3,332,643. In this system a rotor pitch mixing assembly 44 and rotor phase-out assembly 45 in series between the cyclic control stick 39 and the collective pitch control lever 40 transmit signals to the actuators 47, 47a and 47b of the rotor swash plate 46 establishing the cyclic and pitch settings of the main rotor 11. A primary control mixing unit 48, preferably in the nature of a computer which performs the functions of the rudder ratio control unit of U.S. Pat. No. 3,332,643 in establishing a variable ratio of pilot rudder pedal to propeller slip stream deflecting surface movement dependent upon whether the propeller pitch control beeper switch 41 is set in the low pitch range for hover flight or the high pitch range for high speed cruising flight, has an input connection from the propeller pitch control beeper switch 41 and is connected between a rudder pedal deflection indicator 42a and the actuator 49 of the rudder surface 27, the actuator 50 of the duct end sectors 28, 29 and the propeller pitch control actuator 51. The primary control mixing u it 48 also connects to the rotor phase-out assembly 45 to phase out rotor pitch signals received from the rotor pitch mixing assembly 44 and transmit signals to the actuator 52 of the movable elevator surfaces 38, 38a and the actuator 53 for the flaperon (aileron) in shifting aircraft attitude control in pitch and roll to the elevator and flaperon surfaces when the propeller pitch control beeper switch 41 is set in the high pitch range for high speed cruising flight. The pilot's agility maneuvering switch panel 43, the function of which will be subsequently explained and includes an actuating switch 55 and a sector decelerating switch 56, is connected between an accelerating right turn switch assembly 57 and the primary control mixing unit 48.

FIGS. 2–4, 5–7, 8–10 and 11–13 each illustrate different positions to which the propeller slip stream deflecting surfaces, comprising the duct end sectors 28, 29 and the rudder surface assembly 27, are deployed by the control system of FIG. 14 for establishing the varying degree of yaw control required of a rotary wing aircraft under varying flight and maneuvering situations.

FIGS. 2–4 illustrate the positions to which the slip stream deflecting surfaces are deployed when the aircraft is operating in the high speed cruising range with the rotor unloaded and forward aircraft thrust being provided by the shrouded propeller 25. With the propeller pitch control beeper switch 41 set in the high pitch range the primary control mixing unit 48 generates signals that deploy the duct end sectors 28, 29 to the illustrated stowed positions overlying the duct rear end portions 30, 30a of opposite duct lateral sidewalls, positions the rudder surface panels 32, 33 in the illustrated neutral position aligned along the duct longitudinal axis and establishes a direct ratio between rudder pedal and rudder surface deflection, whereby small amounts of rudder movement to the left and right of neutral establish yaw control at high speed cruising flight. The primary control mixing unit 48 phases out rotor pitch signals transmitted to the rotor swash plate 46 through the phase-out assembly 45 so that attitude control of the aircraft in pitch and roll is established by signals transmitted by movement of the cyclic control stick 39 to the actuators controlling the positions of the aerodynamic elevator surfaces 38, 38a and flaperons (ailerons) 54.

Figure 6:
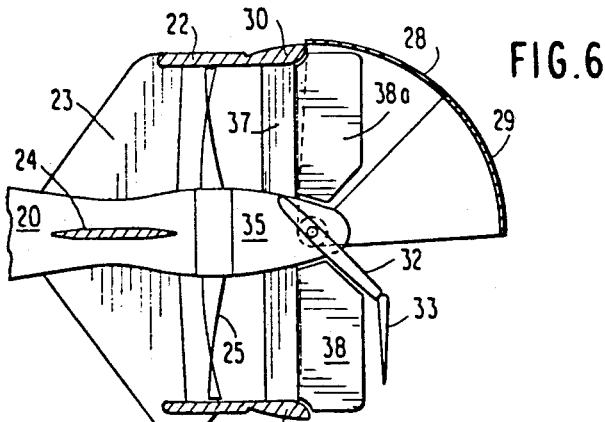
FIG. 6 is a horizontal cross-section along section lines 6—6 of FIG. 5.
Figure 7:
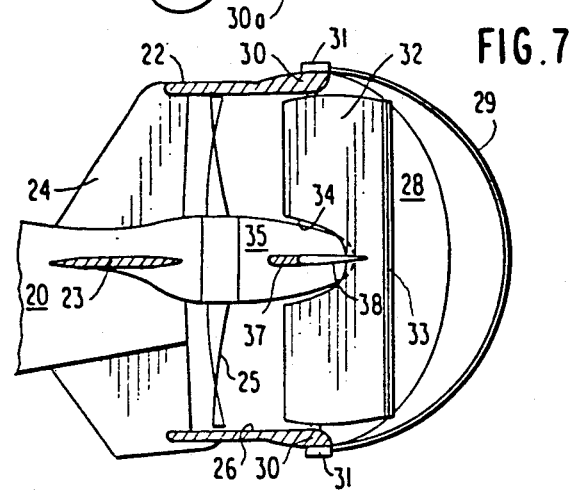
FIG. 7 is a vertical cross-section along section lines 7—7 of FIG. 5.
Figure 5:
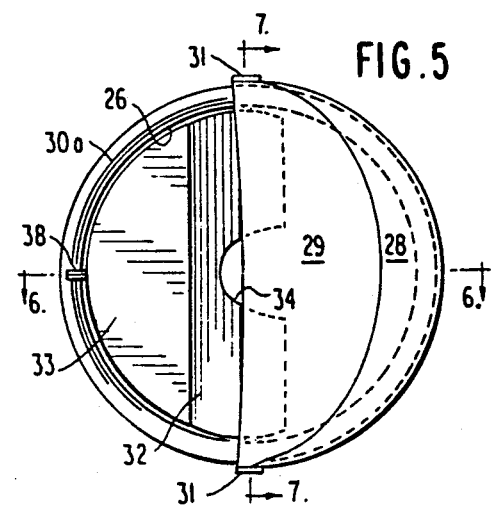
FIG. 5 is a rear elevation of the tail assembly of the aircraft of FIG. 1 with the tail assembly components positioned for normal hovering flight conditions.

FIGS. 5–7 illustrate the positions to which the propeller slip stream surfaces are normally deployed when the aircraft is operating in hovering flight with aircraft lift supplied by the rotor which applies torque to the aircraft proportional to rotor shaft power, which in the illustrated aircraft is clockwise torque. With the propeller pitch control beeper switch 41 set in the low pitch range for hover flight the primary control mixing unit 48 generates signals to the duct end sector actuator 50 rotating the pair of duct end sectors 28, 29 to their normal extended positions, best seen in FIG. 6, in which both sectors are brought into an abutting, juxtaposed array as forms an arc extending from the outer edges of the duct rear wall portion 30 of the right lateral sidewall of the duct obliquely and transversely across the right half open end of the duct. Concurrently the mixing unit 48 generates signals to the rudder panel actuator 49 rotating the forward rudder panel 32, along with the pivotally intercoupled rear panel 33, to the illustrated clockwise fully deflected position. The juxtaposed array of abutting duct end sectors in their illustrated normal extended position, in conjunction with the highly cambered surface of the fully deflected rudder surface panels, establishes a smoothly curving channel extending rearwardly of the end of the duct through which the emerging propeller slip stream is deflected to the left establishing a starboard tail thrust of a magnitude required for aircraft yaw directional control. As previously noted in this normal hovering mode with the propeller pitch control beeper switch in the low pitch range, rudder pedal deflection generates proportional signals in the primary control mixing unit 48 as establishes propeller pitch sufficient to create the magnitude of starboard thrust required for yaw control in establishing the desired aircraft heading. Aircraft attitude control in pitch and roll is maintained in the conventional manner through pitch setting of the rotor swash plate 46 from signals passing through the phase-out assembly 45 from the rotor pitch mixing assembly 44 and generated by the position of the cyclic control stick 39.

Figure 9:
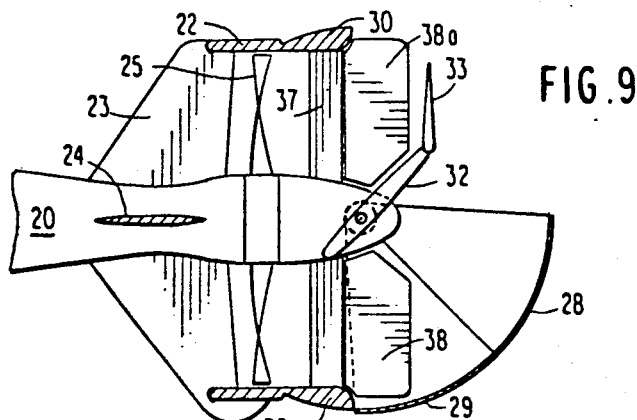
FIG. 9 is a horizontal cross-section along section lines 9—9 of FIG. 8.
Figure 10:
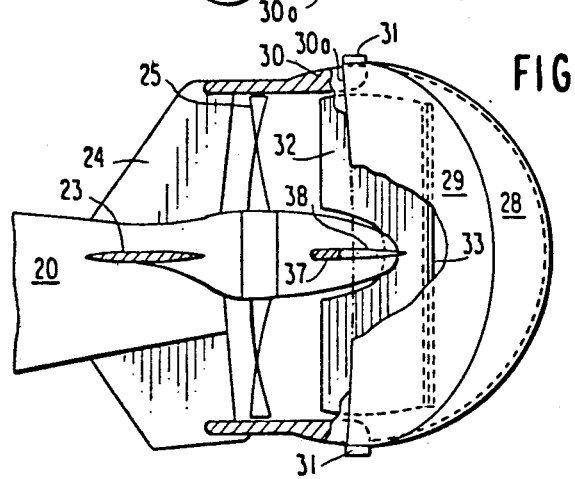
FIG. 10 is a side elevation, partially in section, as viewed from the left of FIG. 8.
Figure 8:
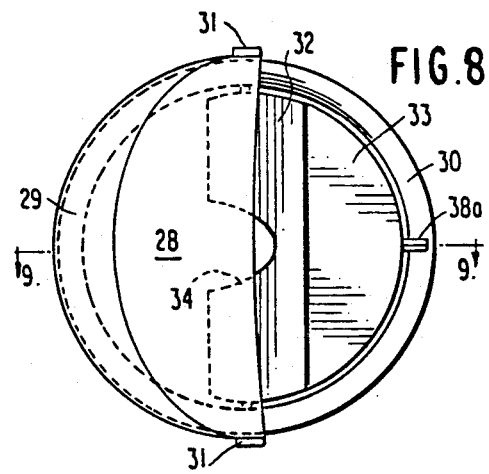
FIG. 8 is a rear elevation of the tail assembly of the aircraft of FIG. 1 with the tail assembly components positioned for a high rate right turn during hovering flight.

As previously discussed, the maximum turning rate of a ring tail aircraft operating in a hover mode, with the propeller slip stream deflecting surfaces deployed in the normal hover position as will deflect the propeller slip stream in a direction counterbalancing rotor torque, e.g. the configuration disclosed in U.S. Pat. No. 4,905,932 or FIGS. 5-7 of this application, is dependent upon the amount of rotor shaft torque being generated to sustain the aircraft under its current flight conditions. As an extreme example, if the aircraft is in a power off mode in autorotation the turning rate would be zero. FIGS. 8-10 illustrate the alternate high turning rate position to which the slip stream deflecting surfaces of the invention can be deployed for augmenting rotor torque to increase turning agility of the aircraft in the direction of rotor torque when operating under low rotor power. Referring to FIG. 14, closing the actuating switch 55 of the maneuver switch panel 53 connects one side of the accelerating turn switch assembly 57, located in the extreme right hand sector of rudder pedal throw, to the primary control mixing assembly 48. Upon applying a high degree of right rudder, the right side of the rudder pedal assembly 42 engages and closes the accelerating turn switch assembly 57 which generates a signal from the primary control mixing unit 48 to the duct end sector and rudder actuators 49, 50 that deploy the duct end sectors 28, 29 and the rudder panels 32, 33 to the alternate positions illustrated in FIGS. 8-10 opposite that of the normal extended and fully deflected positions illustrated in FIGS. 5-7. In this alternate position the propeller slip stream is deflected to the right of the duct which creates a port tail thrust that augments rotor torque and establishes a higher turning rate than can be generated by rotor torque. When hard right rudder is diminished sufficiently to open the accelerating turn rudder assembly 57, the primary control mixing unit 48 generates the normal hover flight signals for deploying the duct end sectors 28, 29 and rudder pedals 32, 33 to the normal hover position illustrated in FIGS. 5-7 for counterbalancing rotor torque to the degree required for yaw control.

Figure 12:
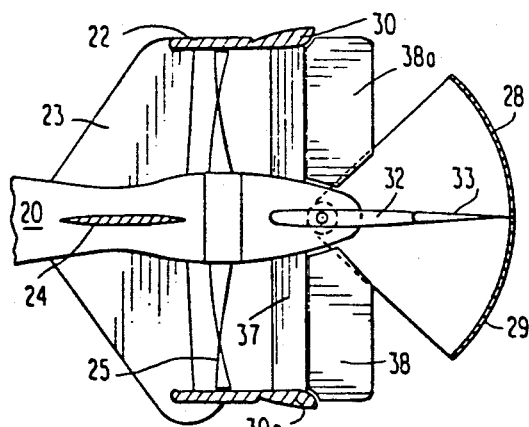
FIG. 12 is a horizontal cross-section along section lines 12—12 of FIG. 11.
Figure 13:
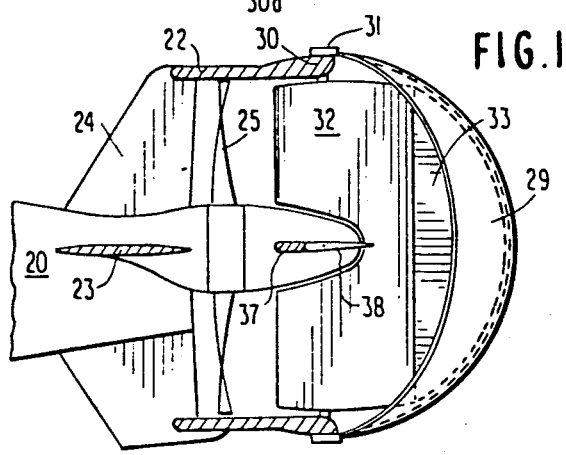
FIG. 13 is a side elevation, partially in section, as viewed from the left of FIG. 11.
Figure 11:
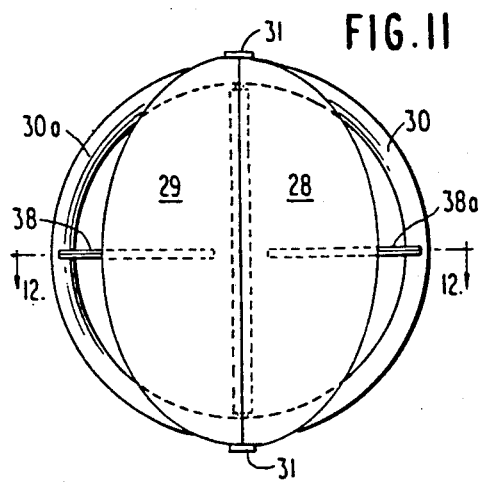
FIG. 11 is a rear elevation of the tail assembly of the aircraft of FIG. 1 with the tail assembly components positioned for rapid retardation of the aircraft in the forward flight condition.

FIGS. 11-13 illustrate another alternate extended position configuration to which the duct end sectors 28, 29 can be deployed for augmenting maneuverability of the aircraft for rapid deceleration of forward speed. In this alternate configuration the duct end sectors 28, 29 are deployed such that their adjacent edges are in an abutting or closely abutting relationship rearwardly of the duct in line with the duct longitudinal axis with the arcuate peripheral surfaces of each sector extending in opposite directions from the duct longitudinal axis toward and spaced from the respective duct rear wall portions 30, 30a creating a partial barrier spaced from and extending partially across the rear open end of the duct, thereby deflecting the propeller slip stream to the left and right as it emerges from the rear open end of the duct in reducing thrust and augmenting normal aircraft drag. The adjacent edge surfaces of the respective sectors 28, 29 can either be in an abutting relationship, as illustrated in FIGS. 10-13, or in a closely adjacent abutting relationship with a small gap between adjacent edge portions of the respective sectors. Deployment of the duct end sectors to the illustrated speed decelerating position is controlled by the two position sector decelerating switch 56 of the maneuver switch panel 53. Closing the actuating switch 55 connects the sector decelerating switch 56 to the primary control mixing assembly 48 which generates signals to the duct and sector actuator 50 that deploy the sectors to either the alternate, decelerating extended position of FIGS. 11-13 or the stowed cruising speed position of FIGS. 2-4 dependent upon which of the two positions in which the sector decelerating switch 56 is set. The rudder surface panels 32, 33 in this decelerating mode are in the normal neutral position established by the high pitch range setting of the propeller pitch control beeper switch 41 for cruise flight with any deflection motion of the rudder panels being established by deflection of the rudder pedals 42.

Obviously, control system configurations other than that described above can be used for deploying the described propeller slip stream deflecting surfaces to the positions illustrated in FIGS. 2-13. The separable duct end sectors 28, 29 need not be individual units and could each comprise a group of multiple nesting sectors of the nature of the elbow segments of U.S. Pat. No. 4,905,932 and the rudder surface 27 could comprise a single rudder panel or comprise three or more pivotally connected panels of the nature disclosed in U.S. Pat. No. 3,260,482.

It should be understood that the foregoing disclosure involves a typical embodiment of the invention and that numerous modifications or alterations may be made therein without departing from the spirit and scope of the invention as set forth in the appendant claims.

What is claimed is:

1. In a rotary wing aircraft tail assembly having a controllable pitch propeller mounted for rotation concentrically within the interior of an annular duct between a front and a rear end portion of said duct and means supported by said duct for deflecting the slip stream of said propeller transversely of the longitudinal axis of said duct rearwardly of said duct rear end portion, the improvement wherein said deflecting means includes:

a pair of spherical duct end sectors of arcuate cross section each configured to extend partially circumferentially of the duct rear end portion of opposite lateral sides of said duct, each said section being a segment of a sphere defined between two opposite side edges extending between top and bottom portions of said segment, means pivotally supporting each said sector from said duct for rotative movement about a vertical axis in disposing said sectors into: (1) a retracted position in which said sectors are spaced apart with each said sector spanning a duct rear end portion of a respective opposite lateral side of said duct and (2) an extended position in which said pair of sectors are in a juxtaposed relationship with adjacent side edges of said sectors abutting and a non-abutting side edge of one of said juxtaposed sectors contiguous with said duct rear end portion of one of said duct opposite lateral sides, means for moving said sectors as establishes said sectors at said retracted and extended positions, a vertically extending rudder surface pivotally supported from said duct rearwardly of said propeller for revolving movement in disposing said rudder surface into: (1) a neutral position in which said rudder surface is coincident with said duct longitudinal axis and into (2) deflected positions in which said rudder surface is angularly disposed with respect to said duct longitudinal axis to include a fully deflected position in which said rudder surface slants across a major portion of the propeller slip stream exit region of said duct between said duct longitudinal axis and one of said duct opposite lateral sides, means for moving said rudder surface as establishes said surface at said neutral and deflected positions and means interconnecting said sector moving means and said rudder surface moving means for disposing said rudder surface into a fully deflected position concurrently with said sectors being disposed into an extended position and disposing said rudder surface into said neutral position concurrently with said sectors being disposed into said retracted position.

2. The improvement of claim 1 wherein said rudder surface comprises a plurality of adjoining rudder panels arranged in tandem, means pivotally connecting each said rudder panel to an adjoining panel and means intercoupling said rudder panels establishing differential angular rotation of adjoining rudder panels about said pivotal connecting means upon said plurality of rudder panels being moved between said rudder surface neutral and deflected positions.

3. The improvement of claim 1 wherein said sector extended position includes a first extended position in which said non-abutting side edge of a first one of said juxtaposed sectors is contiguous with said duct rear end portion of one of said duct opposite lateral sides and a second extended position in which said non-abutting side edge of a second one of said juxtaposed sectors is contiguous with said duct rear end portion of the other of said duct opposite lateral sides.

4. The improvement of claim 3 wherein said rudder surface comprises a plurality of adjoining rudder panels arranged in tandem, means pivotally connecting each said rudder panel to an adjoining panel and means intercoupling said rudder panels establishing differential angular rotation of adjoining rudder panels about said pivotal connecting means upon said plurality of rudder panels being moved.

5. An improved rotary wing aircraft tail assembly having an annular duct with leading and rear end portions between which a controllable pitch propeller is mounted for rotation concentrically of the interior said duct and means supported by said duct for deflecting the slip stream of said propeller transversely of the longitudinal axis of said duct rearwardly of said duct rear end portion, wherein the improvement comprises:

a pair of spherical end sectors of arcuate cross section each configured to extend partially circumferentially of the duct rear end portion of an opposite lateral side of said duct, each said end sector being a segment of a sphere defined between two opposite side edges extending between top and bottom portions of said segment, means pivotally supporting each said end sector from said duct for rotational movement about a vertical axis between: (1) a retracted position in which said pair of end sectors are spaced apart with each said end sector spanning a duct rear end portion of respective ones of said duct opposite lateral sides and (2) a plurality of extended positions in which said pair of end sectors are in a juxtaposed relationship with adjacent side edges of said end sectors abutting and a non-abutting side edge of at least one of said juxtaposed end sectors spaced rearwardly of said duct rear end portion defining an opening rearwardly of and coincident with a lateral side of said duct through which opening said propeller slip stream exits transversely of said duct interior, means for moving said end sectors as establishes said sectors at said retracted and extended positions, a vertically extending rudder surface pivotally supported from said duct rearwardly of said propeller for revolving movement between a neutral position in which said rudder surface is coincident with said duct longitudinal axis and a plurality of deflected positions in each of which said rudder surface is angularly disposed in a different angular relationship with respect to said duct longitudinal axis, means for moving said rudder surface as establishes said surface at said neutral and deflected positions and means interconnecting said end sector moving means and said rudder surface moving means for actuating both said moving means concurrently in establishing movement of said rudder surface into (1) a fully deflected position slanting across a major portion of the region rearwardly of said duct interior between said duct longitudinal axis and one of said duct opposite lateral sides concurrently with movement of said end sectors into an extended position in which a non-abutting side edge of one of said juxtaposed end sectors is contiguous with a duct rear end portion of one of said duct opposite lateral sides and (2) said neutral position concurrently with movement of said end sectors into said retracted position.

6. The improvement of claim 5 wherein said plurality of arcuate end sector extended positions includes a first and a second extended position, in said first extended position a non-abutting side edge of a first one of said juxtaposed sectors is contiguous with said duct rear end portion of one of said duct opposite lateral sides and in said second extended position a non-abutting side edge of a second one of said juxtaposed end sectors is contiguous with said duct rear end portion of the other of said duct opposite lateral sides.

7. The improvement of claim 6 wherein said rudder surface comprises a plurality of adjoining rudder panels arranged in tandem, means pivotally connecting each said rudder panel to an adjoining panel and means intercoupling said rudder panels establishing differential angular rotation of adjoining rudder panels about said pivotal connecting means upon said plurality of rudder panels being moved between said rudder surface neutral and deflected positions.

8. The improvement of claim 5 wherein said plurality of end sector extended positions includes a third extended position in which a non-abutting side edge of both said juxtaposed end sectors are spaced rearwardly of said duct rear end portion of respective opposite lateral sides of said duct.

9. The improvement of claim 5 wherein said rudder surface has a lengthwise span less than the internal diameter of said end sector spherical segments.

10. An improved rotary wing aircraft tail assembly having an annular duct with leading and rear end portions between which a controllable pitch propeller is mounted for rotation concentrically of the interior of said duct and means supported by said duct for deflecting the slip stream of said propeller transversely of the longitudinal axis of said duct rearwardly of said duct rear end portion, wherein the improvement comprises:

a pair of spherical duct extension sectors of arcuate cross section each configured to overlap a semi-circumferential portion of said duct rear end portion of respective ones of the two opposite lateral sides of said duct, each said sector being a segment of a sphere defined between left and right side edges extending between top and bottom portions of said segment, means pivotally supporting said sectors from said duct for rotation about a common axis between: (1) a stowed position in which each said sector overlaps a duct rear end portion of respective ones of said duct two opposite lateral sides and (2) a plurality of extended positions in which said pair of sectors are in juxtaposition with said left and right edges of respective ones of said sectors in an abutting relationship and a non-abutting side edge of at least one of said juxtaposed sectors is spaced rearwardly of said duct rear end portion defining an opening coincident with a duct lateral side through which opening said propeller slip stream exits from said duct, means for moving said sectors as establishes said sectors at said stowed and selected ones of said plurality of extended positions, a vertically extending rudder surface pivotally supported from said duct for revolving movement between a neutral position in which said rudder surface is coincident with said duct longitudinal axis and a plurality of deflected positions in which said rudder surface is disposed transversely of said duct longitudinal axis in different angular relationships, means for moving said rudder surface as establishes said surface at said neutral and deflected positions, and means interconnecting said sector moving means and said rudder surface moving means actuating both said moving means concurrently for: (1) establishing movement of said rudder surface into a fully deflected position in which said rudder surface extends transversely of a major portion of said duct interior as positions the end of said rudder surface adjacent said opening defined between said non-abutting side edge of said at least one sector and said duct end portion concurrently with establishing movement of said sectors into an extended position in which a non-abutting side edge of one of said juxtaposed sectors is contiguous with a duct rear end portion of a duct lateral side opposite said opening and (2) establishing movement of said rudder surface into said neutral position concurrently with establishing movement of said sectors into said stowed position.

11. The improvement of claim 10 wherein said plurality of sector extended positions includes first and second extended positions, in said first extended position a non-abutting side edge of one of said juxtaposed sectors is contiguous with said duct rear end portion along one of said duct two opposite lateral sides and a non-abutting side edge of the other of said juxtaposed sectors is spaced rearwardly of said duct rear end portion of the other of said duct lateral side as will define said propeller slip stream exit opening on one side of said duct and in said second extended position the positions of the respective non-abutting side edges of said juxtaposed sectors are reversed as establishes said slip stream exit opening on the other side of said duct.

12. The improvement of claim 11 wherein said rudder surface comprises a plurality of adjoining rudder panels arranged in tandem, means pivotally connecting each said rudder panel to an adjoining panel and means intercoupling to said rudder panels establishing differential angular rotation of adjoining rudder panels about said pivotal connecting means upon said plurality of rudder panels being moved between said rudder surface neutral and deflected positions.

13. The improvement of claim 10 wherein said plurality of extended positions includes a third extended position in which the non-abutting side edges of both said juxtaposed sectors are spaced rearwardly of said duct rear end portion defining openings through which said propeller slip stream exits from opposite lateral sides of said duct.

14. The improvement of claim 11 wherein said rudder surface comprises a plurality of adjoining rudder panels arranged in tandem, means pivotally connecting each said rudder panel to an adjoining panel and means intercoupling to said rudder panels establishing differential angular rotation of adjoining rudder panels about said pivotal connecting means upon said plurality of rudder panels being moved.

15. The improvement of claim 11 wherein said rudder surface has a lengthwise span less than the internal diameter of said arcuate end sector spherical segments.

* * * * *